United States Patent
Leeson et al.

(10) Patent No.: US 11,045,291 B2
(45) Date of Patent: Jun. 29, 2021

(54) DENTAL RESTORATION PREFORM AND METHOD OF MAKING THE SAME

(71) Applicant: James R. Glidewell Dental Ceramics, Inc., Newport Beach, CA (US)

(72) Inventors: David Christopher Leeson, North Tustin, CA (US); Marco A. Jokada, Diamond Bar, CA (US); Vaheh Golestanian Nemagrdi, Orange, CA (US); Hossein Madanipour, Mission Viejo, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 75 days.

(21) Appl. No.: 15/222,212

(22) Filed: Jul. 28, 2016

(65) Prior Publication Data

US 2017/0035537 A1    Feb. 9, 2017

Related U.S. Application Data

(60) Provisional application No. 62/200,532, filed on Aug. 3, 2015.

(51) Int. Cl.
*A61C 13/00* (2006.01)
*C04B 35/64* (2006.01)
(Continued)

(52) U.S. Cl.
CPC ........ *A61C 13/0022* (2013.01); *A61C 13/083* (2013.01); *B28B 11/08* (2013.01);
(Continued)

(58) Field of Classification Search
CPC .............................. A61C 5/77; A61C 13/0022
(Continued)

(56) References Cited

U.S. PATENT DOCUMENTS 5,257,178 A   10/1993   Hatfield et al.
6,485,305 B1  11/2002   Pfeiffer
(Continued)

FOREIGN PATENT DOCUMENTS

DE   10150647 A1   4/2003
EP    2298228 A1   3/2011
(Continued)

OTHER PUBLICATIONS

Helvey, Gregg A., "Zirconia and Computer-aided Design/Computer-aided Manufacturing (CAD/CAM) Dentistry" Inside Dentistry Apr. 2008, vol. 4, Issue 4, Aegis Communications, Newtown PA, USA.

*Primary Examiner* — Erin Snelting
(74) *Attorney, Agent, or Firm* — Charles Fowler

(57) ABSTRACT

A machinable preform for shaping into dental restorations is described that comprises material having suitable strength for use in dental applications without requiring further processing after shaping to strengthen the material (such as sintering). In one embodiment, a preform is comprised of a machinable dental material having a Vickers hardness value in the range of 4HV GPa to 20HV GPa, and comprises a body and a stem that extends from the outer surface of the body that supports the body during shaping. A method for making the machinable preform, and a kit comprising a machinable preform and a grinding tool, are also described.

20 Claims, 8 Drawing Sheets

(51) Int. Cl.
  *B28B 11/08* (2006.01)
  *A61C 13/083* (2006.01)
  *C04B 35/48* (2006.01)
  *A61C 5/77* (2017.01)
  *A61C 13/12* (2006.01)

(52) U.S. Cl.
  CPC .............. *C04B 35/48* (2013.01); *C04B 35/64* (2013.01); *A61C 5/77* (2017.02); *A61C 13/12* (2013.01)

(58) Field of Classification Search
  USPC ................................................ 264/16–17, 19
  See application file for complete search history.

(56) References Cited

U.S. PATENT DOCUMENTS

| | | | |
|---|---|---|---|
| 6,663,390 B2 | 12/2003 | Riley et al. | |
| 8,197,299 B2 | 6/2012 | Heinz et al. | |
| 9,615,902 B2 | 4/2017 | Miguel et al. | |
| 2006/0204932 A1 | 9/2006 | Haymann et al. | |
| 2010/0285429 A1 | 11/2010 | Karim et al. | |
| 2010/0291509 A1* | 11/2010 | Berggren | A61C 13/0003 433/199.1 |
| 2012/0177456 A1* | 7/2012 | Jung | B23C 3/00 408/1 R |
| 2012/0219930 A1 | 8/2012 | Heinz et al. | |
| 2012/0291284 A1* | 11/2012 | Warden | A61C 13/0004 29/896.1 |
| 2013/0288026 A1 | 10/2013 | Johnson | |
| 2013/0316305 A1 | 11/2013 | Carden et al. | |
| 2013/0316306 A1 | 11/2013 | Carden et al. | |
| 2014/0308623 A1 | 10/2014 | Chang | |
| 2015/0097305 A1 | 4/2015 | Hufschmied | |
| 2015/0125821 A1 | 7/2015 | Theelke et al. | |

FOREIGN PATENT DOCUMENTS

| | | |
|---|---|---|
| JP | H10277060 A | 10/1998 |
| WO | WO9913796 A1 | 3/1999 |
| WO | 0113862 A1 | 3/2001 |
| WO | WO13164411 A1 | 7/2013 |

* cited by examiner

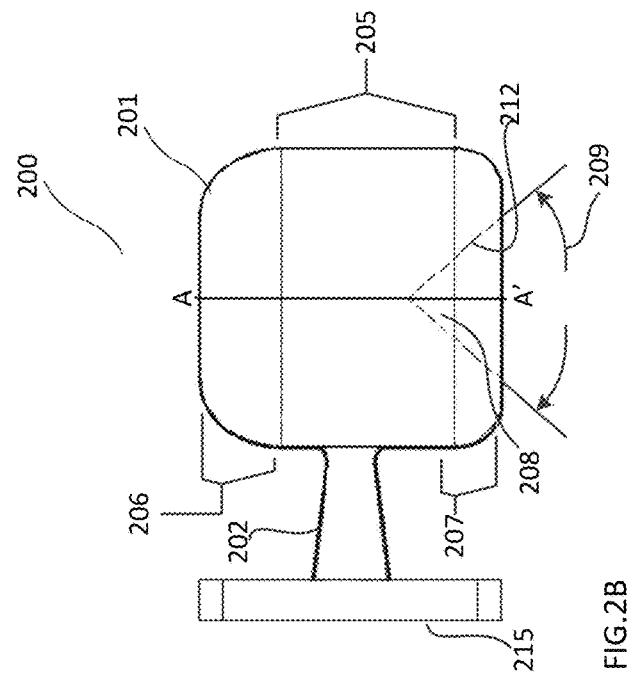
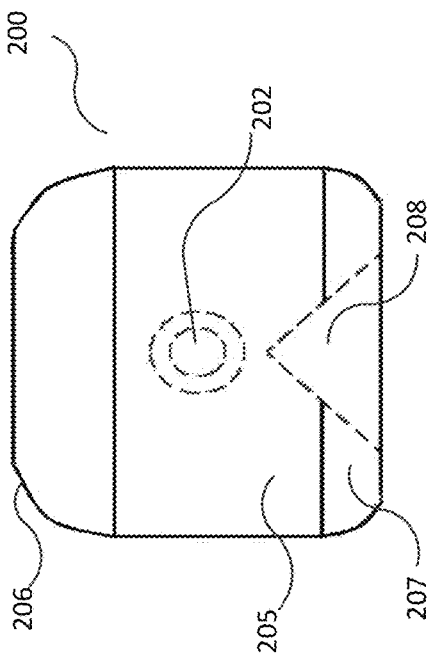
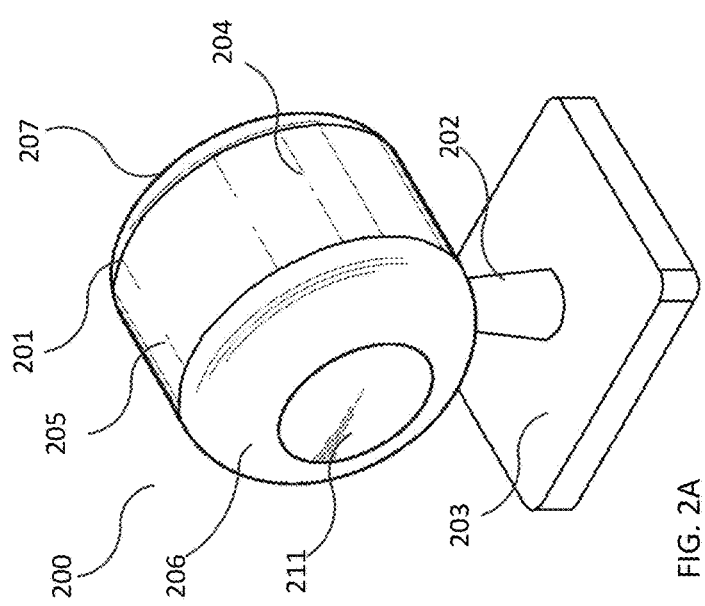
FIG. 2B
FIG. 2C
FIG. 2A

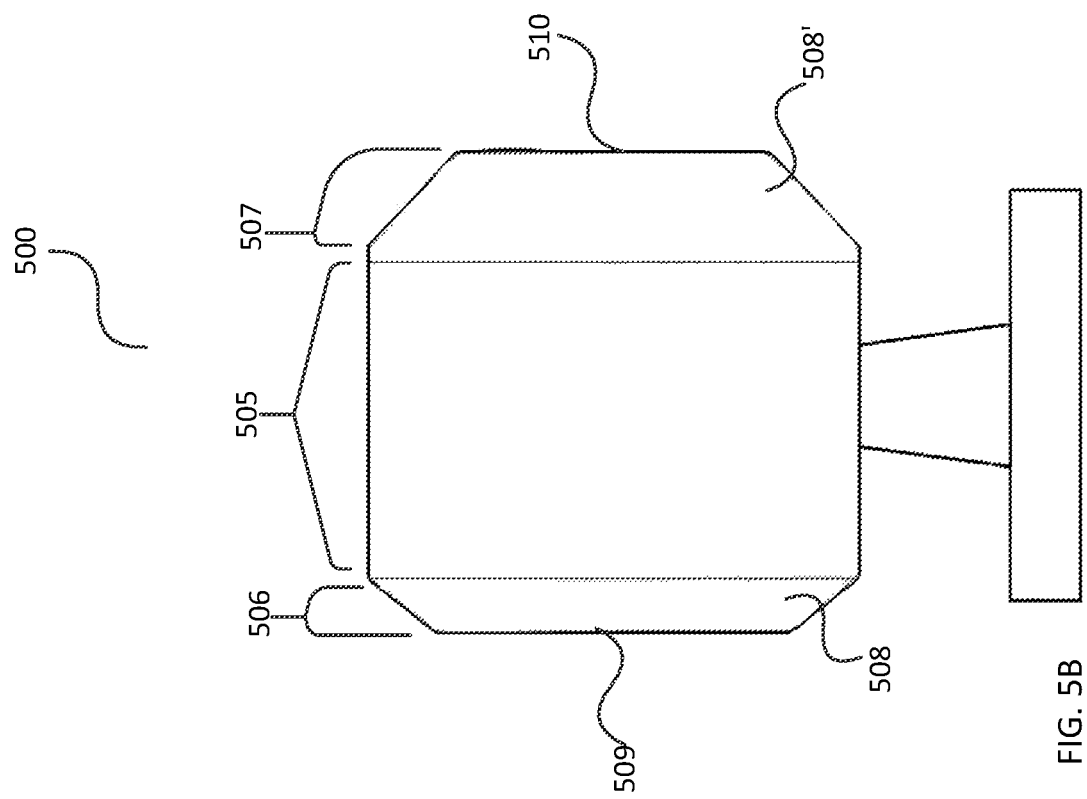
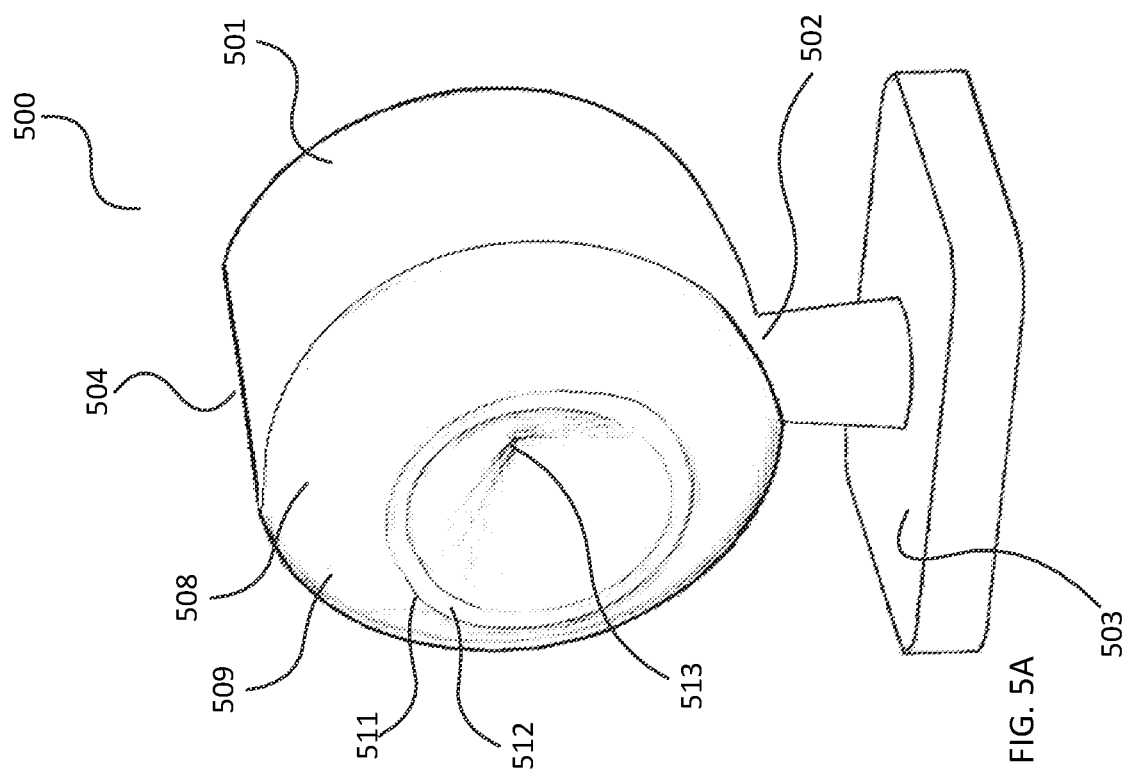
FIG. 5A
FIG. 5B

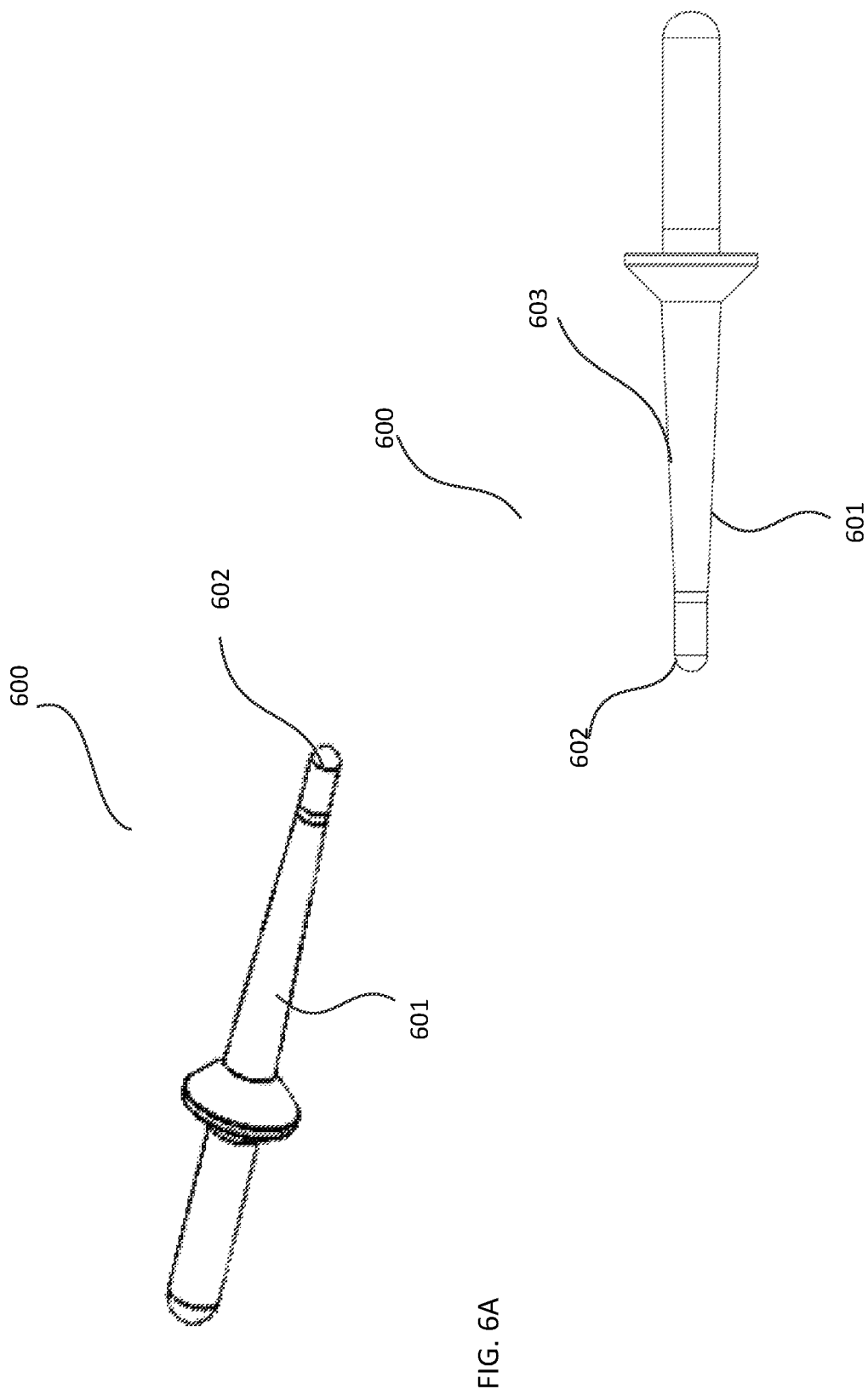

DENTAL RESTORATION PREFORM AND METHOD OF MAKING THE SAME

CROSS-REFERENCE TO RELATED APPLICATION

This application claims the benefit of and priority to U.S. Provisional Patent Application No. 62/200,532, filed on Aug. 3, 2015, the entirety of which application is incorporated herein by reference.

BACKGROUND OF THE INVENTION

Ceramic materials known for use in the field of dentistry provide high strength restorations such as crowns, bridges, and the like. Some ceramic materials have flexural strength values exceeding 800 MPa when fully sintered, resulting in restorations that are resistant to chipping, breakage and wear. Material advances provide enhanced aesthetics in color and translucency while maintaining acceptable strength, and restorations may be manufactured from these materials in a cost effective manner.

Dental restorations created by computer assisted design processes may be milled by CAM processes from porous ceramic materials in the green or pre-sintered ceramic stage, using an enlargement factor to accommodate reduction in overall size upon heating to full density. After milling, the porous restoration design is sintered to full density to produce a final restoration. Disadvantageously, the separate steps of milling the porous ceramic dental design and sintering the milled shape to form the final restoration, may preclude dentists from making chair-side ceramic restorations, increasing the amount of time a patient must wait for repair.

To reduce the amount of time to make a chair-side restoration, US2006/0204932 discloses an assemblage or library of "smart" mill blanks pre-configured into geometries and sizes that closely resemble the final dental parts. Material waste may be reduced compared to traditional mill blanks that have a single size and shape, which is desirable when using precious or semi-precious materials. The smart mill blank library is described as comprising a series of blanks with geometries that differ other than by scale, and preferably having at most, one symmetric plane. The blank is mounted in a shaping apparatus by the integrated holder that has an orientation-specific attachment key for the milling machine.

Methods of making ceramic restorations from near net shape millable blanks are also known, for example, from commonly owned U.S. Patent Application Pub. No. 2013/0316305, which is hereby incorporated by reference in its entirety. A kit is disclosed containing millable blanks of various shapes, each shape designed to closely replicate a restoration shape thus minimizing material removal in chair-side processes. The kit comprises a variety of shapes and shades of restoration blanks, as well as chair-side software, and a chair-side milling machine to convert millable blanks into finished, contoured restorations by a dentist.

SUMMARY OF THE INVENTION

A machinable preform is described that is shapeable into a dental restoration with sufficient strength for anterior or posterior applications without the need for a further processing step to strengthen the dental restoration after it has been shaped. A sintered preform may be shaped into a colored final, custom dental restoration. The sintered preform comprises a body of sintered material and a stem projecting from the center of the preform body. Using a chair-side machine, a dental restoration may be shaped from the sintered preform, requiring no sintering after shaping, significantly reducing the time to create a custom finished product. The sintered preform has a unique size and shape that accommodates most custom restoration designs, and reduces the amount of sintered material to be removed during shaping a dental restoration. Advantageously, the placement of the stem facilitates a unique tool path and machining strategy for shaping dental restorations from sintered materials with no further sintering after shaping a dental restoration.

A method for making a sintered preform is also disclosed that comprises the steps of obtaining unsintered material, shaping the unsintered material into an unsintered shaped form having a body and a stem, and sintering the shaped form to full density to form the sintered preform. Unsintered material obtained in the form of a single block may be milled into an unsintered, unitary continuous shaped form. Alternatively, unsintered material is molded by injection molding, into the unsintered shaped form. In another alternative, unsintered material is molded into an intermediate shaped form, and then milled for further shape refinement prior to sintering to a final shaped form. In one embodiment, a pre-sintered ceramic block is milled into an intermediate shaped form, and then sintered to full density to form the sintered preform which may be shaped by a chair-side mill into a finished dental restoration. Advantageously, the preform stem facilitates a unique tool path and machining strategy for shaping a dental restoration from the sintered body. A unique tool is also described for use in shaping the sintered preform into dental restorations.

Custom dental restorations may be designed using known CAD (computer-aided design) processes, and CAM applications are applied to create a milling path and machining strategy based on the positional information of the nested restoration design to machine the disclosed preform into the final dental restoration. Unique nesting strategies may be developed based on the preform shape and stem position that result in efficiencies in tool paths and machining strategies when machining a custom restoration from a sintered preform.

BRIEF DESCRIPTION OF THE DRAWINGS

FIG. 2A. A top perspective view of a preform according to one embodiment.

FIG. 2B. A side view of a preform according to one embodiment.

FIG. 2C. A front view of a preform according to one embodiment.

FIGS. 5A and 5B. A bottom perspective view and side view, respectively, of a preform according to one embodiment.

FIGS. 6A and 6B. A front perspective view and a side view, respectively, of a grinding tool according to one embodiment.

DETAILED DESCRIPTION

Figure 1A:
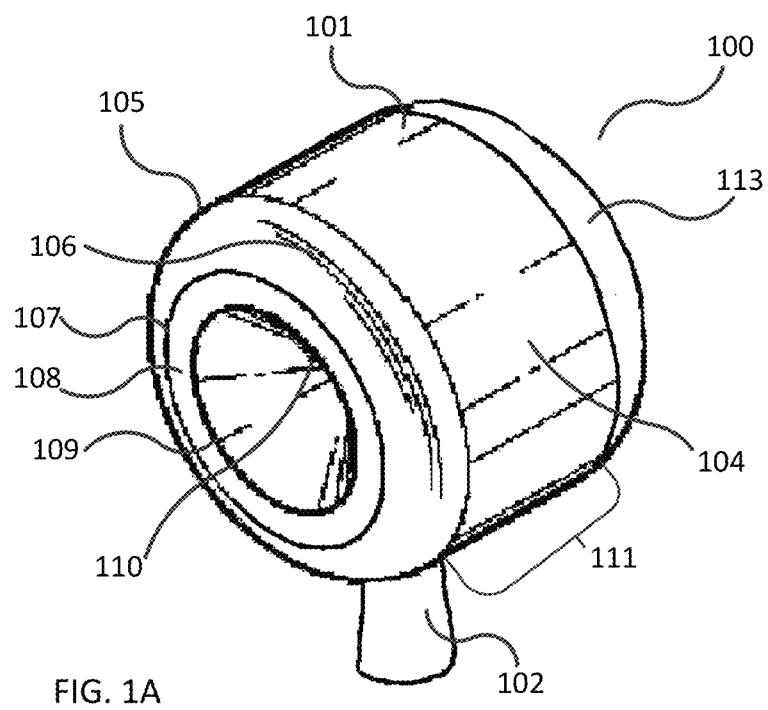
FIG. 1A. A bottom perspective view of a preform according to one embodiment.

A machinable preform is disclosed that may be shaped chair-side into a final dental restoration, such as a crown, that has sufficient material hardness and strength for insertion directly into the mouth of a patient without requiring sintering after shaping. With reference to an embodiment illustrated in FIGS. 1A and 1B, a machinable preform (100) comprises a preform body (101) and a preform stem (102) that projects from the preform body (101). As exemplified in FIG. 1B, a dental restoration design (103) has full rotation within a model of the preform body for selected nesting and placement of the dental restoration design (103) relative to the preform stem (102). The position of the stem on the final dental restoration upon shaping the restoration from the machinable preform is determined by the nesting position.

In one embodiment illustrated in FIGS. 2A, 2B, and 2C, a preform (200) has a circular-cylindrical body (201) having a cylinder body length (line A-A'). The preform body (201) comprises a curved outer surface (204) and a center portion (205) between a top end (206) and a bottom end (207). In FIGS. 2A, 2B, and 2C, the cylindrical body (201) length (line A-A') is oriented substantially orthogonally to the stem (202) length (FIG. 3A, line C-C'). The stem (202) projects away from the curved outer surface (204) of the cylindrical body, and extends to an attaching member (203) for direct or indirect attachment to a shaping machine. The preform body (201) further comprises a cavity (208) extending from a cavity breakout dimension in the bottom end (207) toward the center portion (205). The curved outer surface (204) of the cylindrical body center portion (205) as exemplified in FIGS. 2A, 2B and 2C is substantially smooth, with the center portion (205) having a uniform outer diameter between top and bottom ends.

Figure 3B:
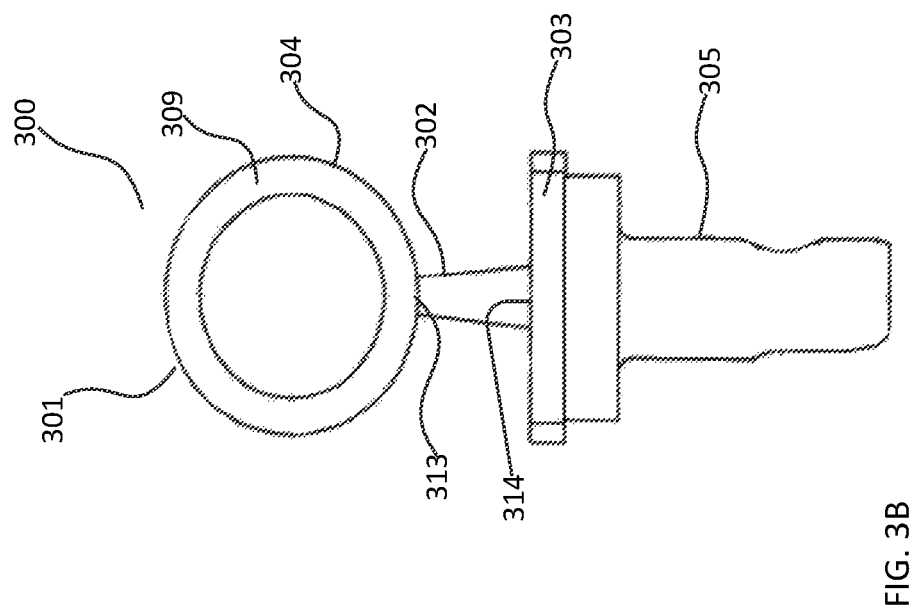
FIG. 3B. A top view of a preform according to one embodiment shown attached to a mandrel.
Figure 3A:
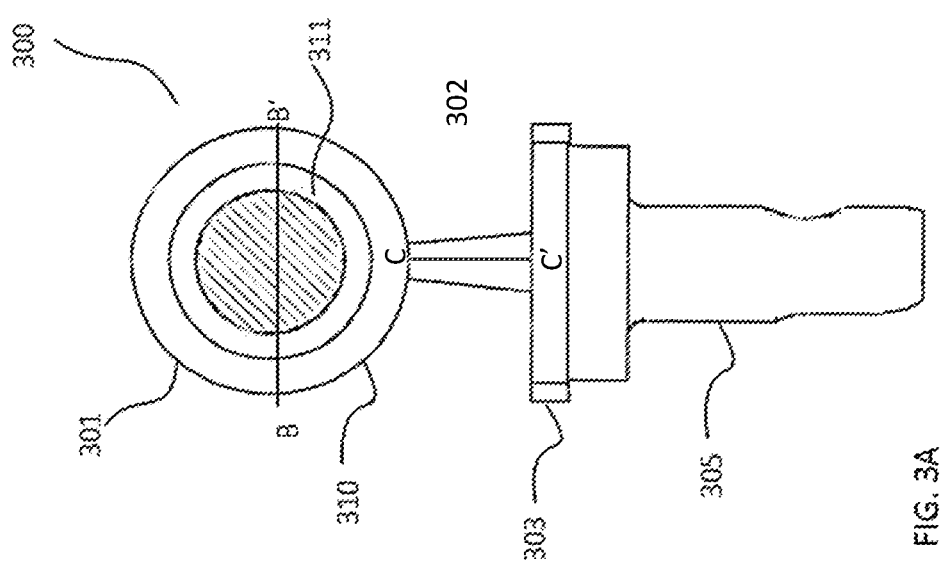
FIG. 3A. A bottom view of a preform according to one embodiment shown attached to a mandrel.
Figure 3C:
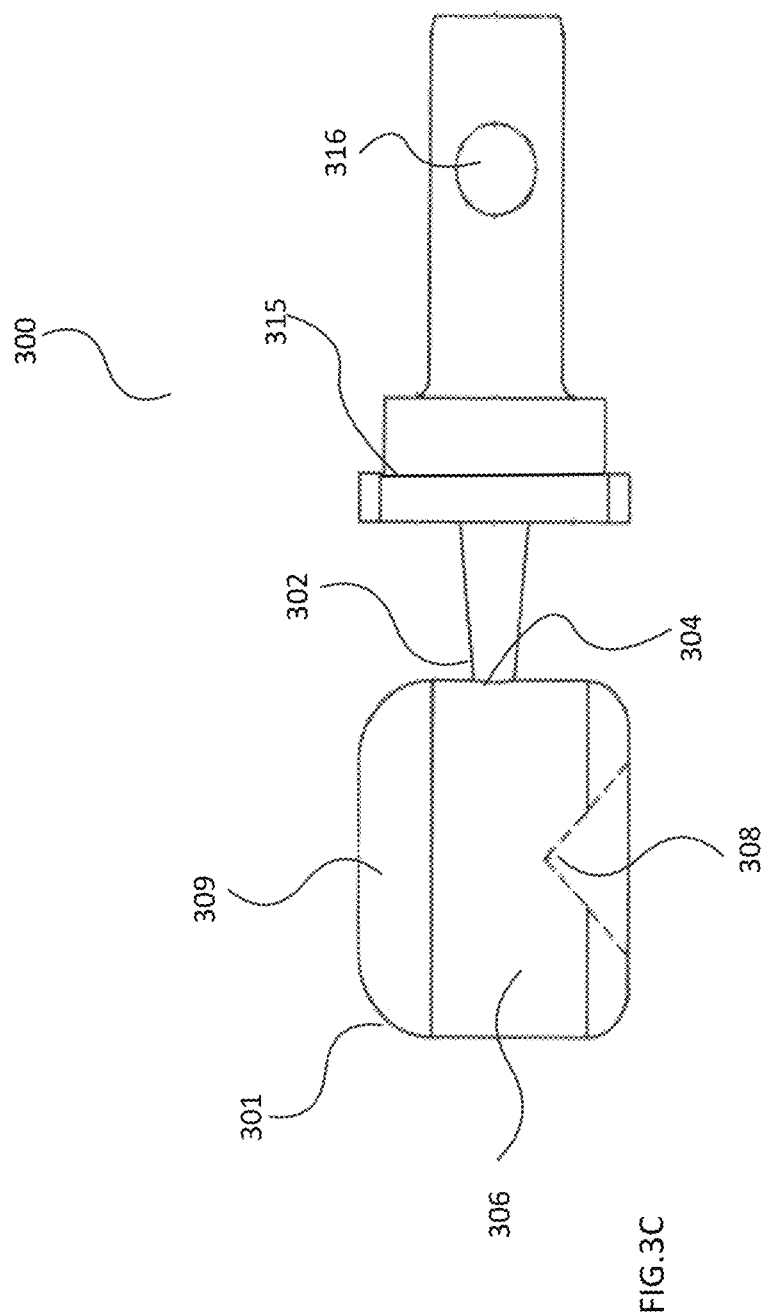
FIG. 3C. A side view of a preform according to one embodiment shown attached to a mandrel.

FIGS. 3A, 3B and 3C illustrate an embodiment of a preform (300). The cylindrical preform body (301) comprises circular top end face (309) and bottom end face (310), a center portion (306) with a substantially circular cross-section having outer diameter (line B-B'), and a concavity (311) from which a cavity (308) extends inwardly towards the center portion (306). The stem (302) extends away from the curved preform body outer surface (304) of the center portion approximately equidistance between top and bottom ends. The stem extends between the curved center portion (306) and an attaching member (303). The attaching member (303) attaches to a mandrel (305) by the attaching member bottom surface (315), and provides indirect attachment of the preform to a shaping machine.

Figure 1B:
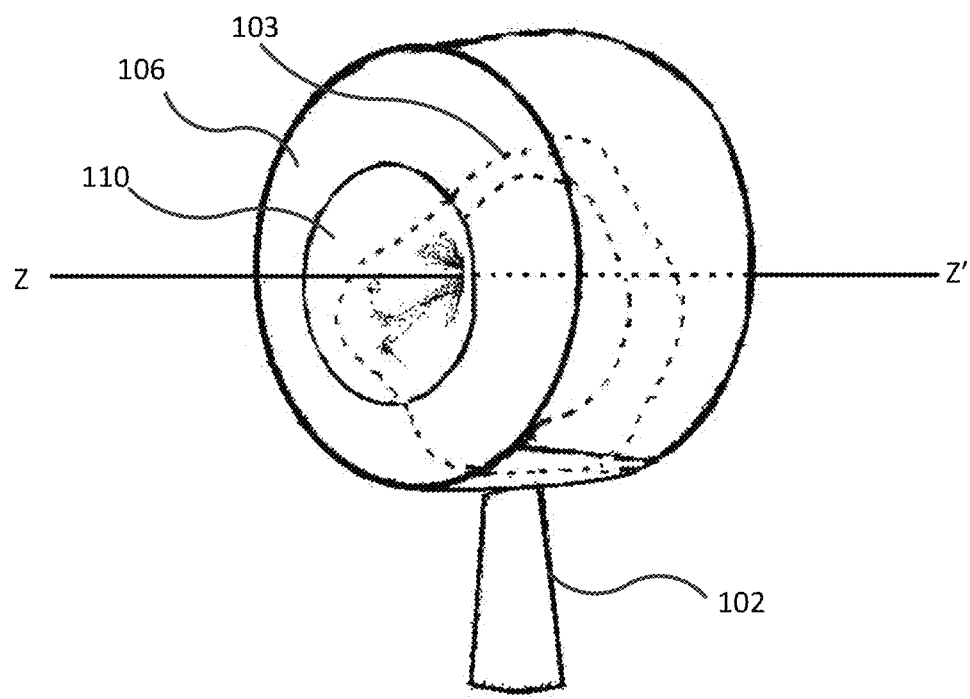
FIG. 1B. A restoration design nested within one embodiment of a preform viewed from the bottom perspective view.

The preform body from which the restoration crown is shaped may comprise a center portion in the form of a cylinder, as depicted in the Figures, though other shapes may be suitable for use herein. Alternately, the body (101) or body center portion, comprises, for example, an ellipsoid cylinder, a polyhedron, curved polyhedron, a cylinder with flattened surfaces, a cube, a cube with rounded edges, and the like. FIG. 1B illustrates an embodiment in which the shape and size of a preform body (101) accommodates complete rotation of a restoration design (103) within the preform body around the z-axis (line Z-Z'); thus, the preform comprises 360 degree (full rotation) stem (102) placement relative to the final restoration. The outer diameter of the circular cross-section of the center portion from which the restoration design is shaped may be from about 12 mm to about 20 mm, or from about 13 mm to about 18 mm, or from about 14 mm to about 17 mm. The length of the preform body between the top end and the bottom end is sufficient to accommodate the height of most dental restoration designs (400) when measured, for example, from the highest point of the occlusal surface (404) to the lowest point on a tooth margin (405); thus, the length of the preform body or the center portion of the preform body may be less than 20 mm, or less than 18 mm, or less than 16 mm, or less than 15 mm, or may be between about 10 mm and 15 mm. In some embodiments, the ratio of the cross-sectional diameter of the center portion to the length of the preform body is greater than 1.0:1.0.

Figure 1C:
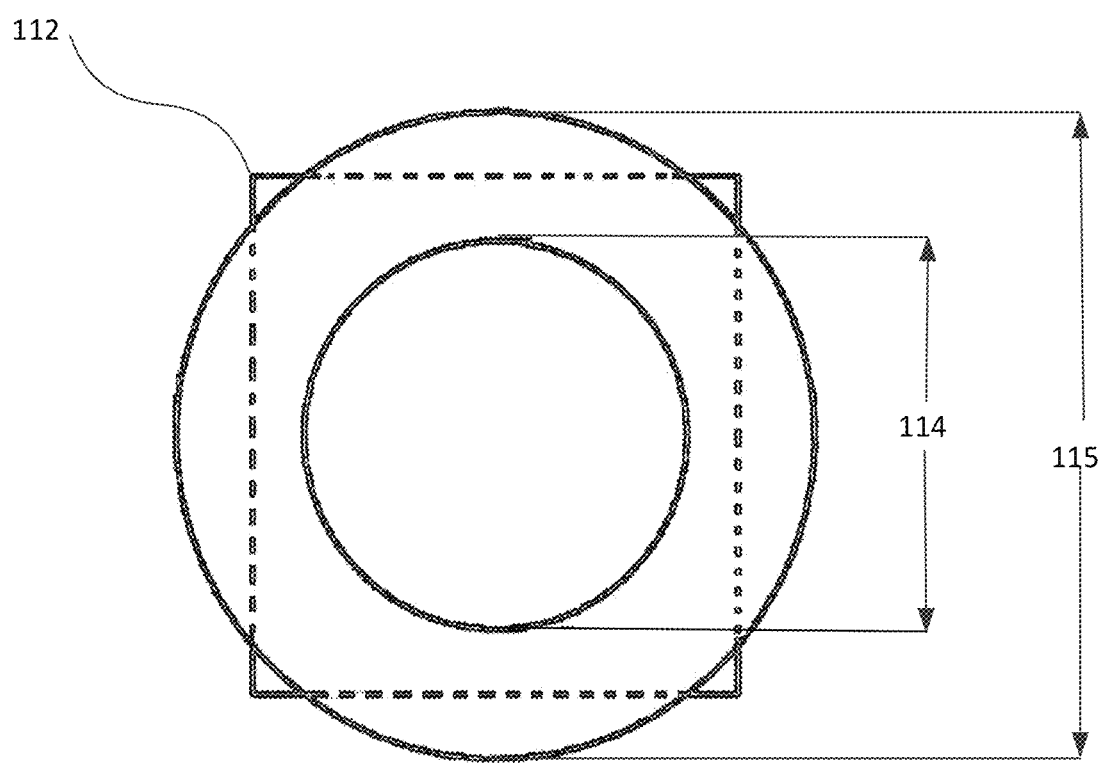
FIG. 1C. An illustration of dimensions of a block.

In some embodiments, a preform body having a non-circular cross-section or an irregular shaped cross-section, has a cross-sectional geometry within the center portion for full rotation (360 degrees) of the restoration design around the z-axis. A preform body comprising a top portion, a bottom portion, and a center portion there between has a cross-sectional geometry (approximately parallel with top and bottom surfaces) with an inscribed circle diameter greater than approximately 12 mm and a circumscribed circle diameter less than approximately 20 mm at a location where the stem projects from the center portion. In contrast, a representation of a block having a size and shape of known milling blocks (e.g. approximately 15 mm×16 mm) has a cross-sectional geometry (112) as illustrated in FIG. 1C. In this example, an inscribed circle (114) of a selected diameter (e.g. 12 mm) fits within the cross-sectional dimensions of the representative block. However, the cross-sectional geometry of the representative block does not fit within a circumscribed circle (115) of a selected diameter (e.g., about 20 mm) thus, reducing the size of the crown design that may be fully rotated within the known block design without increasing the size of the block.

In some embodiments, the preform body has flat end faces and a uniform cross-sectional diameter or width throughout the length of the body. Alternatively, top and bottom end regions (206, 207) taper to comprise top and bottom end faces with smaller cross-sectional diameters or widths than the center portion (205). Tapered top and/or bottom end portions may comprise a shaped edge between the preform outer surface (204) of the center portion and an end face (e.g., bottom end face 211), or a shaped edge around a cavity (208) on the end face, or both. For example, as illustrated in FIG. 1A, the bottom end region (105) has a first filleted edge (106) between the outer surface (104) of the center portion and a bottom end face (107); further, a second filleted edge (108) surrounds a concavity (109) on the bottom end face (107), and a cavity (110) extends inwardly from the second filleted edge toward the center portion (111) of the cylindrical body. In the embodiment illustrated FIG. 1A, preform body tapers to a top end region (113) that comprises a filleted edge between the top end face (not illustrated) and the preform body outer surface (104).

A further preform (500) is exemplified in FIG. 5A (bottom view) and FIG. 5B (side view) which illustrate a preform body (501) comprising a stem (502) and an attachment member (503) wherein both a bottom end region (506) and top end region (507) have chamfered edges (508, 508'). The preform body outer surface (504) diameter tapers from the center portion (505) to the bottom and top end faces (509, 510, respectively). The bottom end region (506) exemplified in FIG. 5A has second chamfered edge (511) forming a concavity (512) on the bottom end face (509), and a cavity (513) extends from the concavity toward the center portion.

In some embodiments, a machinable preform having one or more shaped edges has less material to be removed when making a final dental restoration, such as a crown. Shaped edges around the cavity may facilitate access to the cavity by a shaping tool. Further, a cavity substantially devoid of preform material may reduce the amount of material to be removed when shaping the restoration. As exemplified in FIG. 5A, the cavity (513) extends from the cavity opening into the center portion of the preform body from a concavity on the top and/or bottom end faces forming an inner surface. In other embodiments, a cavity is formed in each of the front end and back end of a preform.

The shape of each cavity may be the same or different, and may comprise, but is not limited to, an inverted cone, dome, cylinder, trough, or the like, or may have an irregular shape. An opening or breakout geometry of the cavity may have a width (or diameter, for example where the breakout area is circular) that is between about 20% and 80% of the outer diameter or width of the center portion of the preform body. For ease of discussion, the term width as used herein may refer to diameter, as well. In some embodiments, the opening of the cavity has a width that is about 30% to about 75%, or between about 40% to about 75% of the outer width of the center portion of the preform body, or between 50% and 80% of the outer width of the center portion, or the cavity opening or break-out dimension has a surface area that is about 50% to about 80% of the surface area of a top end face, a bottom end face, or a center portion cross-section.

The approximate cavity depth may be between 5% and 50% of the length of the preform body, or between 10% and 35% of the length of the preform body, or between 10% and 30% of the length of the body, when the preform is measured from top end to bottom end. A circular cavity opening may have an inner diameter of up to about 75 percent of the outer surface diameter of the preform body when measured from the end face.

In some embodiments, the preform body has an inner surface (212) in the approximate shape of an inverted cone, formed by the cavity. The inner surface is accessed by the machining tool and machined to form the concave surface of the dental restoration that attaches to and abuts the structure in the patient's mouth. By nesting a restoration design within a model of the preform body, and coaxially aligning the cavity of the preform with the restoration design concave inner surface, the amount of material removal during the shaping process is reduced.

In one embodiment, the preform body comprises a cross-section width (which as discussed above may refer to a diameter) and length that accommodates the size of at least about 90% of all single anterior and posterior (for example, $1^{st}$ and $2^{nd}$ molars and bicuspids) dental restorations, eliminating the need for dentists to accumulate an inventory of multiple sizes and shapes of preforms. The preform body may be designed based on information regarding previously prepared restoration designs of different shapes and sizes. In one embodiment, a preform body is designed by electronic representations of thousands of single crown restoration designs that are obtained, and then overlaid so that convex inner surfaces of the restoration designs are oriented around a common axis (for example, as shown in FIG. 1B). In one embodiment, the preform body design is a composite of restoration designs of multiple anterior teeth types (e.g., central incisors, lateral incisors, cuspids, and optionally, $1^{st}$ and $2^{nd}$ bicuspids). In another embodiment, the preform body design is a composite of restoration designs of multiple posterior teeth types (e.g., $1^{st}$ and $2^{nd}$ molars, and optionally $1^{st}$ and $2^{nd}$ bicuspids). In another embodiment, the preform body design is a composite of restoration designs of anterior and posterior teeth types.

The overlaid restoration designs, coaxially aligned, are rotated around a common axis. Upon rotation, the largest dimensions of the composite designs, for example, the restoration design parting lines or silhouette, form the greatest outer surface dimension of a shaped body design. In some embodiments, the outer surface of the shaped body design may be smoothed based on the greatest outer surface dimensions to form a substantially cylindrical shape and circular cross-section having a diameter of suitable size to nest about 90% of the restoration designs with 360 degree rotation around a center axis (e.g., line Z-Z'). Preform edges between bottom and top ends, and the center portion may be shaped as described above. Optionally, a preform cavity design corresponds to the composite restoration design concave surface that is smoothed to provide an inverted cone-shaped inner surface in the preform body.

In one embodiment, a preform body having a rounded or circular cross-sectional design is provided that has less material volume compared to a standard preform block shape having a cube or rectangular prism shape with approximately 90 degree angles at the edges or corners that accommodates a similarly sized composite restoration design. Moreover, a single preform design that accommodates full rotation of a composite restoration design around the z-axis, is in contrast to near net shape blocks having asymmetric geometries that mimic or resemble asymmetric tooth features. The near net shaped blocks with tooth features do not accommodate rotation of restoration designs, and require a large library or kit of specific tooth types or tooth numbers to ensure fitment of a range of possible restoration types and sizes.

The stem provides support for the preform body during shaping of the final restoration. The stem length may provide a sufficiently large space between the preform body and an attaching member to allow for placement of a grinding tool in a position adjacent the preform body for entry into a tool path without contacting preform material. In an embodiment exemplified in FIGS. 3A and 3B, the stem (302) bridges the cylindrical body (301) and attaching member (303), and extends generally orthogonally from the cylindrical body outer surface approximately mid-way between the top end and bottom end. The stem may project from the outer surface of a preform equidistance from a top end face and a bottom end face, or within about 10% to about 25% of halfway between a top end face and a bottom end face. In other embodiments, the distance of the stem connection to the top end or bottom end is equal to about 20% to about 80% of the preform body length, or about 25% to about 75% of the length of the preform body, or a distance that is equal to about 30% to 70% of the length of the body, or a distance that is equal to about 40% to 60% of the length of the body.

Figure 4:
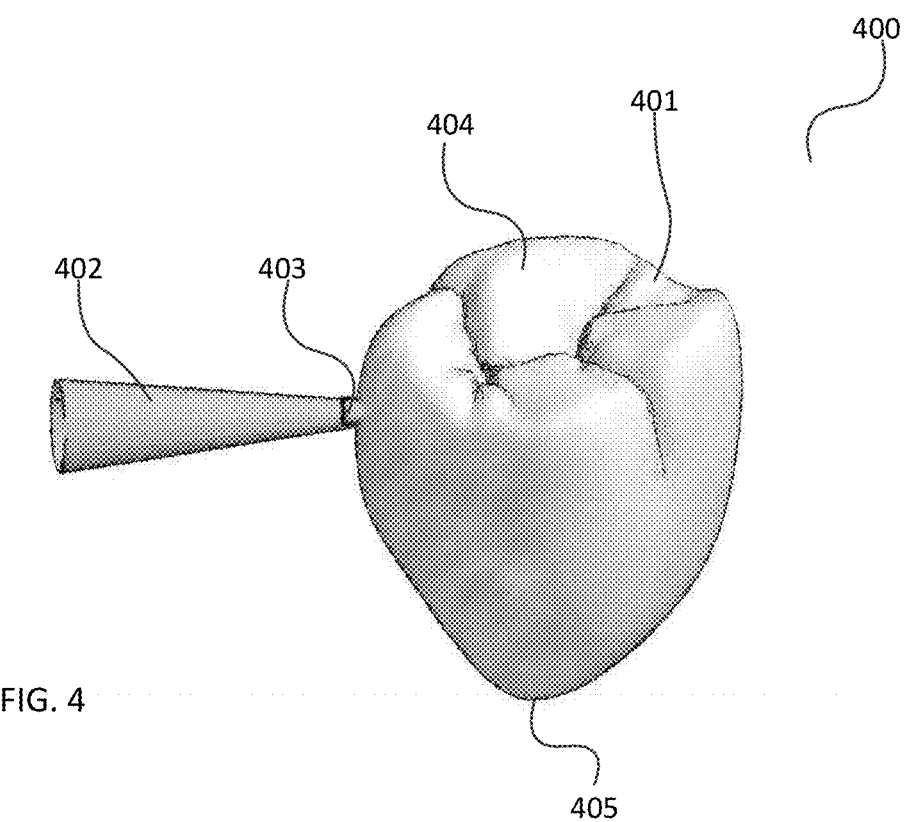
FIG. 4. A prospective view of a restoration according to one embodiment that is made from a preform, and the preform stem.

The axis of the stem length (line C-C') may be substantially orthogonal to the axis of cylindrical body (301) length (line A-A'). In some embodiments, the stem length axis is within about 30 degrees or within about 45 degrees from orthogonal, relative to the preform body length. The shape of the stem may be a cylinder, cone, prism or the like. In one embodiment, a preform body that tapers to shaped edges at the front and back ends, comprises a stem that extends from the center portion of the preform body, and after machining, the stem is connected to the middle of a final restoration (400), away from the occlusal surface and the edge or margin of the final restoration, as seen in FIG. 4.

In one embodiment, the preform body is a fully sintered material and the flex strength of the stem (302) at the first end (313) is sufficiently high to support the sintered preform (300) during machining from a sintered state, and sufficiently low for the finished restoration to easily be broken off from the stem, for example, by hand. The stem (302) of a preform (300) remains attached to and supports the sintered cylindrical body (301) at the first end (313) throughout the shaping process until a finished restoration is obtained. In contrast to the preform bodies described herein having a stem (302) extending from the outer surface of the shapeable preform body, traditional restoration milling processes produce sprues or connectors during the shaping process that are remnants of unsintered block materials.

In some embodiments, prior to shaping the restoration, the length of the preform stem is greater than the stem width at the first stem end (313) proximate the preform body. The stem length may be between about 3 mm and about 12 mm, or between about 3 mm and 10 mm. In some embodiments, the stem length may be greater than about 3 mm, or greater than about 4 mm, or greater than about 5 mm, or greater than about 6 mm, or greater than about 8 mm. In one embodiment, the width (for purposes herein, 'width' may also be used to refer to a stem diameter) of the first stem end proximate the cylindrical body is less than the width (diameter) of the second stem end (314) proximate the attaching member (303). The first stem end width may be in the range of 1 mm to 5 mm, or about 1 mm to about 4 mm, or about 1.5 mm to about 3.5 mm, or 1.5 mm to about 3 mm, or less than or equal to about 4 mm, or less than or equal to about 3 mm, or less than or equal to about 2.5 mm, or less than or equal to about 2 mm.

In some embodiments, the ratio of stem length to the first stem end width (the end proximate the cylinder body) is greater than or equal to 1.5:1, or greater than 2:1, or greater than 3:1, or greater than 3.5:1, and less than 6:1, or less than 5:1, or less than 4.5:1, or less than or equal to about 4:1. In one embodiment, the stem has sufficient length to provide access and placement of a machining tool between the attaching member and the cylindrical body, without the tool contacting the preform material, to reduce wear on the machining tool when machining the cylindrical body near the stem. Thus, in this embodiment, the stem length is greater than the diameter of the tool tip, tool shank or both.

The attaching member (303) is joined to the stem at the second end of the stem (314) and secures the machinable preform directly to a shaping machine, or indirectly to an intermediary component (such as a mandrel 305) during the shaping process. The shape and size of the attaching member may be compatible with any machine or intermediary mandrel suitable for shaping the sintered preform to a final dental restoration. The attaching member may secure the sintered preform directly or indirectly to the machine by a mechanical means including, a clamp, a grip, adhesive or other mechanical attachment. For example, the attaching member having a substantially flat bottom surface (315) shaped as a square, rectangular, or circle may be adhesively attached to a mandrel, as exemplified in FIG. 3A. In another embodiment (not shown), the sintered preform comprises an attaching member that is insertably mountable into a mandrel, and is secured by gripping or clamping the attaching member in the mandrel. In one example of this embodiment, the stem is lengthened and the second stem end is shaped to insert into a mandrel. The attaching member may comprise a mechanical attaching means for attachment to a mandrel or directly to a shaping machine, such as a hole (316) for placement of a screw, or a dove tail.

Preform materials may include those having a Vickers hardness value greater than or equal to about 4HV GPa (Macro Vickers Hardness), or a value in the range of 4HV GPa to 20HV GPa, when measured according to the method provided herein. Alternatively, preform materials have a Vickers Hardness value between 5HV GPa and 15HV GPa, or between 11HV GPa and 14HV GPa. Preform body materials comprising hardness values within this range may include metals, such as cobalt chrome, glass and glass ceramics, such as lithium silicate and lithium disilicate, and ceramics, including sintered ceramics comprising alumina and zirconia. Dental restoration materials, including but not limited to commercially available dental glass, glass ceramic or ceramic, or combinations thereof, may be used for making the machinable preforms described herein. Ceramic materials may comprise zirconia, alumina, yttria, hafnium oxide, tantalum oxide, titanium oxide, niobium oxide and mixtures thereof. Zirconia ceramic materials include materials comprised predominantly of zirconia, including those materials in which zirconia is present in an amount of about 85% to about 100% weight percent of the ceramic material. Zirconia ceramics may comprise zirconia, stabilized zirconia, such as tetragonal, stabilized zirconia, and mixtures thereof. Yttria-stabilized zirconia may comprise about 3 mol % to about 6 mol % yttria-stabilized zirconia, or about 2 mol % to about 7 mol % yttria-stabilized zirconia. Examples of stabilized zirconia suitable for use herein include, but are not limited to, yttria-stabilized zirconia commercially available from (for example, through Tosoh USA, as TZ-3Y grades). Methods form making dental ceramics also suitable for use herein may be found in commonly owned U.S. Pat. No. 8,298,329, which is hereby incorporated herein in its entirety.

Unsintered materials may be shaped into an intermediate form having substantially the same geometry as the sintered preform, but with enlarged dimensions to accommodate shrinkage upon sintering, where necessary. The intermediate shaped form may be made by injection molding, or milling, or grinding unsintered materials. Suitable unsintered ceramic materials include ceramic powders and ceramic blocks that have not been fully sintered to theoretical maximum density. Ceramic powders may be made into blocks by processes including molding and pressing, including biaxial or iso-static pressing, and may optionally comprise binders and processing aids. Optionally, ceramic powder may be processed into blocks by slip casting processes, including processes described in commonly owned U.S. Patent Publication Nos. 2009/0115084; 2013/0231239; and 2013/0313738, incorporated by reference in their entirety.

Colored materials may be used to make shaded machinable preforms having the color of natural or artificial dentition, requiring no further coloring after formation of the dental restoration. Coloring agents may be incorporated during powder or block formation to more closely match the appearance of natural or commercially available artificial dentition than uncolored or unshaded ceramic materials. For example, U.S. Patent Publication 2013/0231239, describes methods for coloring ceramics by colloidal dispersion and casting the ceramics by slip casting methods, and is incorporated by reference herein, in its entirety. A further example includes US Patent Publication 2014/0109797, which teaches methods for making colored ceramic powder, formed into green state ceramic bodies by isostatic or biaxial press manufacturing processes is also incorporated by reference herein in its entirety. Optionally, coloring agents may be mixed directly with ceramic powders for example, as metallic salts, coloring liquids, or colorized powders, prior to pressing into blocks. Optionally, intermediate preform shapes made from porous materials are shaded, for example, by dipping into coloring liquids, and then sintered.

Unsintered materials include green state and pre-sintered ceramic blocks made by the above processes that may be heated or partially sintered reducing porosity to facilitate shaping without chipping or breakage. Pre-sintered blocks are hard enough to retain structure for milling into shaped forms, yet soft enough to allow for rapid shaping without damage the milling tool, and have not been heated or sintered to full density. Pre-sintered blocks useful in the methods described herein include porous blocks that may have a density in the range of about 50% to about 90%, or 50% to 95%, of the theoretical maximum density of the fully sintered ceramic material. It should be noted that the pre-sintered density may include non-ceramic binder as well as ceramic particles, compared to the theoretical pore-free density of a fully sintered ceramic block. In some embodiments, the theoretical maximum density of fully sintered zirconia ceramics is between about 5.9 g/cm$^3$ to about 6.1 g/cm$^3$, or for example, or about 6.08 g/cm$^3$. Pre-sintered blocks suitable for use in making intermediate shaped forms include commercially available ceramic milling blocks including those sold under the trade name BruxZir® (for example, BruxZir® Shaded 16 Milling Blanks, Glidewell Direct, Irvine, Calif.).

Upon sintering, porosity in pre-sintered ceramic blocks results in shrinkage that may be calculated from the material density with highly predictable shrinkage. Thus, an intermediate shaped form may be larger than the final preform by a scaled factor that anticipates the reduction in size upon sintering to full density. Likewise, intermediate shaped forms made by injection molding unsintered ceramic materials that shrink upon sintering, are designed with an enlargement factor that anticipates size reduction upon sintering. CAD/CAM processes may be used to design the intermediate shaped form, and send corresponding milling instructions for milling with a scaled enlargement factor. Intermediate shaped forms can be milled with commercially available mills and milling tools, for example, as specified by the manufacturer according to the requirements of the ceramic milling blocks.

A unitary or monolithic preform comprising the preform body, stem and, optionally, attaching member, are shaped from a single continuous green-state block or pre-sintered ceramic block, requiring no separate attachment step for attaching the stem and/or attaching member to the preform body. Alternatively, the stem and attaching member may be made as a unitary structure and attached to the preform body as a separate step. In another embodiment, the shaped preform is made by known molding processes, including injection molding, to form a unitary or monolithic preform comprising the preform body, stem and, optionally, the attaching member as a continuous structure. Alternatively, a shaped form may be made by a combination of molding and milling techniques, for example, where an intermediate shaped form is first molded, and then the stem and/or attaching member is milled by standard milling techniques. Alternatively, the stem and attaching member may be separately attached to a preform body, before or after sintering.

The intermediate shaped form may be sintered to a density greater than about 95% of the theoretical maximum density by known sintering protocols. For sintering ceramic preforms, such as zirconia ceramic preforms, to densities greater than about 95%, or greater than about 98% or greater than about 99%, or greater than about 99.5%, of the maximum theoretical density of the ceramic body, material manufacturing protocols suitable for sintering dental restorations may be used. For example, an intermediate shaped form milled from a pre-sintered zirconia block may be sintered at a temperature between about 400° C. and 1700° C., for between about 30 minutes and 48 hours, or according to the sintering protocol provided by the manufacturer of ceramic blocks to form a sintered zirconia preform having a density in the range of about 5.8 g/cm$^3$ and 6.1 g/cm$^3$, such as 6.08 g/cm$^3$, or in a range of about 5.9 g/cm$^3$ and 6.0 g/cm$^3$.

The preform body comprises materials that may be shaped as dental restorations and that have sufficient strength properties to be acceptable for use in anterior, posterior or both anterior and posterior dental restoration applications, without additional post-shaping processing steps to alter the material strength properties after shaping, such as by sintering. Sintered preforms may comprise zirconia ceramic materials that have high flexural strength, including strength values greater than about 400 MPa, or greater than about 500 MPa, or greater than about 600 MPa, or greater than about 800 MPA, when tested by a flexural strength test method for zirconia materials as outlined in ISO 6872:2008, as measured and calculated according to the 3 point flexural strength test described for Dentistry-Ceramic Materials.

One method of making a machinable preform for use in dental restorations is disclosed that comprises the steps of a) obtaining an unsintered zirconia ceramic material; b) shaping an unsintered shaped form from the unsintered zirconia ceramic material, wherein the unsintered shaped form comprises: a cylindrical body of unsintered ceramic material comprising a top end, a bottom end, and a center portion between the top and bottom ends; and a cavity in at least one of the top or bottom ends; a stem that projects from the outer surface of the center portion of the cylindrical body; and c) sintering the unsintered zirconia ceramic shaped form to achieve a density of about 98% to about 100% percent of the theoretical maximum density of the zirconia ceramic body to form the machinable sintered preform.

In one embodiment of the method, the unsintered zirconia ceramic material is a single pre-sintered ceramic block, and the step of shaping the unsintered ceramic shaped form comprises milling the zirconia pre-sintered ceramic block into a monolithic shaped form comprising a body portion and a stem as a continuous structure. In another embodiment, the step of shaping the unsintered ceramic form comprises molding the unsintered ceramic material into the monolithic shaped form. In one embodiment, the pre-sintered zirconia ceramic shaped form comprises a cylindrical body and a stem having a first size, and is sintered to form a sintered zirconia preform comprising a cylindrical body and a stem having a reduced second size.

Sintered zirconia preforms that have been fully sintered are shaped into a finished dental restoration based on a CAD design using a CNC machine and a grinding tool. A final dental restoration (400) made from the sintered preform is exemplified in the illustration of FIG. 4. A restoration crown (401) shaped from the sintered preform is shown prior to removing the stem (402), which extends from a crown outer surface between the margin of the tooth and the occlusal (biting) surface. In some embodiments a minimal amount of sintered preform material (403) remains from the cylindrical body between the final dental restoration crown (401) and the stem (402) which may be removed upon removal of the stem, for example, by hand-sanding. In one embodiment, a single grinding tool may be used to shape a fully sintered zirconia preform into a finished restoration in less than about 60 minutes.

Dental restorations may be shaped by grinding tools instead of traditional milling tools that are unsuitable for shaping detailed dental restorations from materials having high hardness values. A grinding tool (600), for example as illustrated in FIG. 6, comprises a shank (601) that comprises an embedded diamond coating (603) on the shank and tip (602). Diamonds suitable for use herein include blocky or friable diamonds having an average size in the range of about 90 micron to about 250 micron, or an average size in the range of about 107 micron to about 250 micron, or an average size in the range of about 120 micron to about 250 micron, or for example, an average size in the range of about 120 micron to about 180 micron. Suitable diamond coatings include those with diamonds embedded by a metal alloy layer for more than half the average height of the diamond, for example, as determined by SEM analysis. In some embodiments, grinding tools have a diamond coated shank having a metal alloy layer having thickness that is greater than about 50%, or greater than about 60%, or greater than about 70%, or greater than about 80%, or between about 60% and 90%, of the average diamond height. Grinding tools having a coating of diamonds that are embedded to a depth of about 50% to 95% of the average diamond size or height, or about 60% to about 95% of the average height of the diamond, or about 80% to about 90% of the height of the diamond height are useful for shaping machinable preforms, such as fully sintered zirconia preforms, having the hardness values described herein. In one embodiment, a grinding tool has a diamond coated shank comprising an average diamond grit size in the range of 126 grit to 181 grit, and a nickel alloy layer having a thickness that is greater than or equal to about 70% of the average diamond height.

A kit is provided for forming a dental restoration that comprises a grinding tool and a machinable preform, wherein the preform material has suitable strength and hardness values for use as a posterior dental restoration crown without the need for post-shaping treatment to modify strength properties of the dental restoration that is shaped from it. The machinable preform comprises a preform body and a stem that extends generally orthogonally from the preform body length. The single grinding tool may be used to shape the preform body into a final dental restoration, and the grinding tool comprises a diamond-coated shank comprising diamonds with an average size in the range of 107 micron to 250 micron, embedded in a metal alloy layer having a thickness that is in the range of about 60% to 95% of the diamond height. In one embodiment, the preform body comprises a pre-shaded material that has been selected, for example, to match existing dentition or a shade guide color, and requires no post-shaping coloring or sintering.

In a further embodiment, a plurality of similarly shaped preform bodies are provided in a multiplicity of colors suitable for use in making dental restorations in a range of dental shades that require no post-shaping coloring or sintering, such as shades corresponding to the VITA classical shade guide, the ADA guidelines, or other commercially recognized shade guide colors suitable for use in the dental industry.

Test Methods
  Flexural Strength Test
  Flexure tests were performed on sintered test materials using the Instron-Flexural Strength test method for zirconia materials as outlined in ISO 6872:2008.

Test bars were prepared by cutting pre-sintered materials taking into consideration the targeted dimensions of the sintered test bars and the enlargement factor (E.F.) of the material, as follows:

starting thickness=3 mm×E.F.;

starting width=4 mm×E.F.;

starting length=55 mm×E.F.

The cut, pre-sintered bars were sintered substantially according to the sintering profile listed above for the Translucency Test. Flexural strength data was measured and calculated according to the 3 point flexural strength test described in ISO (International Standard) 6872 Dentistry-Ceramic Materials.

Vickers Hardness Number

Preform materials may be tested for hardness using a Vickers hardness (macro-hardness test). Hardness numbers (HV) may be calculated as described in ISO-6507, or by determining the ratio of F/A where F is the force applied in $kg/m^2$ and A is the surface area of the resulting indentation ($mm^2$). HV numbers may be converted to SI units and reported in units, HV GPa, as follows: H(GPa) =0.009817HV.

Examples 1-21

Twenty-one zirconia crowns of multiple tooth types (numbers) were shaped from sintered zirconia preforms by the methods described herein.

Pre-sintered zirconia milling blocks were obtained (BruxZir® Shaded milling blocks, Glidewell Direct, Irvine, Calif.) and milled into cylindrically shaped preforms. The preforms having a circular cross-section were milled by standard milling procedures incorporating an enlargement factor calculated from the block density. The intermediate pre-sintered shaped forms had a cylindrical body, with a top and bottom end, a stem having a first stem end equidistance from the top and bottom ends, the stem extended orthogonally from the center portion relative to the length of the cylindrical body, an attaching member attached to a second stem end, substantially as depicted in FIG. 1A. The preforms had a cavity extending inwardly from a bottom end face. The stem had sufficient length between the attaching member and the cylindrical body for positioning the tip of a ball nose grinding tool in the z-axis direction without contacting the sintered preform. The attaching member shape and size was compatible for attaching to a mandrel used with the CNC machine in the grinding process.

The pre-sintered shaped forms were sintered according to sintering profile of the zirconia blocks provided by the manufacturer to form fully sintered zirconia preforms having a density between about 5.9 $g/cm^3$ and 6.1 $g/cm^3$. The fully sintered preforms had a body length between about 12.8 mm and 14.2 mm, a cross-sectional outer diameter of about 14 mm to 15 mm, a cavity breakout diameter on the bottom end surface having a diameter of about 7 mm to 8 mm, a first stem end width of about 2-2.8 and a stem length between about 6.8 and 7.3 mm.

The fully sintered zirconia preforms made according to the above-procedure were glued to metallic mandrels and grinded into multiple tooth shapes based on CAD design files using a 3+1 axes CNC machine (z, x, and y axes direction movement of grinding tool, plus rotation of the preform between tool path cycles). The grinding tool comprised diamonds (size: 126) embedded in nickel plating to about 80%-90% of the average diamond height. A CAM lacing cycle, with step over capability in both planar and the grinding tool axial direction, was utilized to grind all surfaces of the crown. The grinding tool had a grit size between about 90-210.

An air spindle with rotational speed of about 150000 rpm and a minimum inlet air pressure of about 85 psi were used to grind the fully sintered zirconia preform. The CAM lacing cycle parameters were determined based on tooth number, and grinding surface of the sintered preform relative to the top or bottom of the restoration, the stem side or the side opposite the stem side of the restoration). Restorations were made from the sintered preforms for posterior teeth numbers 2, 3, 14, 15, 18, 19, 30 and 31 in under 60 minutes as seen in Table 1.

TABLE 1

Time to completed restoration from Sintered Preform in Minutes.

| Example Number | Tooth # | Time (in Minutes) for each example |
|---|---|---|
| 1-4 | 2 | 52; 47; 51; 44 |
| 5-8 | 3 | 53; 49; 54; 57 |
| 9-10 | 14 | 47;51 |
| 11 | 15 | 38 |
| 12-14 | 18 | 54; 55; 47 |
| 15 | 19 | 49 |
| 16-19 | 30 | 53; 48; 50; 50 |
| 20-21 | 31 | 49;50 |

FIG. 4 illustrates a restoration made according to the Examples having minimal residual material remaining between the stem and restoration after grinding is completed. The restoration crown may be snapped off of the stem.

Examples 22-25

Zirconia crowns were shaped from sintered zirconia preforms that were made substantially according to the methods provided in Examples 1-21.

A restoration design was created for a second molar (tooth number 15) using a dental CAD system (IOS™ FASTDESIGN) based on patient scan data. The restoration design was nested within a computer model of a preform. The size and shape of the preform provided full rotation of the restoration design around the z-z' axis providing alternate locations on the crown restoration design for positioning the preform stem. The restoration design was nested four times to provide four nested designs, and in each nesting operation, the stem of the preform was positioned in one of four different locations, as indicated in Table 2. Nesting positions included placement of the Y-axis of the stem between mesial contact area and buccal surfaces (mesio-buccal), between distal contact area and buccal surfaces (disto-buccal), between distal contact area and lingual surface (disto-lingual), and between mesial contact area and lingual surface (mesio-lingual).

The sintered zirconia preforms were grinded using grinding tools and methods substantially according to Examples 1-21. As reported in Table 2, dental restorations were successfully produced from the sintered zirconia preforms in two out of the four nested designs. The successful restorations were produced in under one hour.

TABLE 2

Forming A Dental Restoration From Multiple Nesting Options.

| Ex.# | Stem Location | Successful Completion | Time (minutes) to Completion |
|---|---|---|---|
| 22 | Mesio-buccal | Yes | 38 |
| 23 | Disto-buccal | No | — |
| 24 | Disto-lingual | Yes | 42 |
| 25 | Mesio-lingual | No | — |

The shape and size of the preform design provided full rotation of the dental restoration design within the geometry of the preform body providing multiple nesting opportunities to enable successful shaping of a dental restoration from a fully sintered ceramic preform while reducing the amount of sintered material to be removed during the grinding process.

We claim:

1. A method of making a machinable preform for use in shaping a dental restoration comprises the steps of:
 a) obtaining an intermediate preform material;
 b) shaping the intermediate preform material to form an intermediate shape comprising:
  a body of intermediate preform material comprising an outer surface, a top end, a bottom end, and a center portion between the top and bottom ends, and optionally, a cavity extending toward the center portion from at least one of the top and bottom ends; and
  a stem projecting from the outer surface at the center portion between the top and bottom ends at a first stem end; and
  an attaching member attached to a second stem end; and
 c) sintering the intermediate shape to a density of 98% to 100% of the theoretical maximum density of the intermediate preform material to form a sintered, machinable preform, the machinable preform upon sintering having a Vickers hardness value in the range of 10HV GPa-15HV GPa, the machinable preform comprising:
  a stem comprising a first stem end that has a width of less than or equal to 4 mm and
  a body of machinable sintered material comprising a center portion comprising machinable sintered material throughout a cross-section of the center portion adjacent the first stem end and a cross-sectional geometry having an inscribed circle diameter greater than 12 mm and a circumscribed circle diameter less than 20 mm at the first stem end.

2. The method of making a machinable preform of claim 1, wherein the machinable sintered preform comprises ceramic, glass or glass ceramic.

3. The method of making a machinable preform of claim 1, wherein the sintered preform comprises a sintered zirconia ceramic material that is 85% by weight or more of fully sintered, stabilized zirconia or fully sintered yttria-stabilized zirconia.

4. The method of making the machinable preform of claim 1, wherein the cavity has an inverted cone or an inverted dome shape having a width that decreases from a cavity opening towards the center portion, and wherein the width of the cavity opening is 40% to 75% of a width of the center portion of the machinable preform.

5. The method of claim 1 wherein the intermediate preform material is a pre-sintered ceramic block, and the step of shaping the intermediate preform material comprises milling the pre-sintered ceramic block into a monolithic intermediate shape.

6. The method of claim 1, wherein the step of shaping comprises molding the intermediate preform material into the intermediate shape.

7. The method of claim 1, wherein the attaching member extends generally orthogonally to the second stem end.

8. The method of claim 1, wherein the step of shaping comprises forming a center portion having a curved outer surface at the location of the first stem end.

9. The method of claim 1, wherein the step of shaping comprises tapering the outer surface between the center portion and the top end, between the center portion and the bottom end, or between the center portion and both the top and bottom ends.

10. The method of claim 1, wherein the step of shaping comprises forming a fillet or chamfer on the outer surface between the center portion and the top end, the bottom end or both the top and bottom ends.

11. The method of claim 1, wherein the step of shaping the intermediate preform material to form the intermediate shape comprises injection molding.

12. The method of claim 1, wherein the step of shaping the intermediate preform material comprises a casting process.

13. The method of claim 1, wherein the machinable preform comprises lithium silicate or lithium disilicate.

14. The method of claim 1, wherein the machinable preform comprises a sintered, yttria-stabilized zirconia ceramic.

15. The method of claim 1, wherein the sintered preform is machinable into a final dental restoration crown by a grinding process in fewer than 60 minutes.

16. A method of making a sintered, machinable preform for use in shaping a final dental restoration comprising the steps of:
   a) obtaining an intermediate preform material;
   b) shaping the intermediate preform material to form an intermediate shaped form that comprises a body comprising an outer surface, a top end, a bottom end, and a center portion between the top and bottom ends; and
   c) providing a stem that projects from a first stem end orthogonally from the outer surface of the center portion and, the first stem end has a width of less than or equal to 4 mm when sintered; and
   d) providing an attaching member attached and extending generally orthogonally to a second stem end; and
   e) sintering the intermediate shaped form to a density of 98% to 100% of the theoretical maximum density of the intermediate preform material to form the sintered, machinable preform, the sintered machinable preform having a Vickers hardness value in the range of 10HV GPa-15HV GPa, wherein the center portion after sintering is a solid body of sintered material that has a cross-sectional geometry having an inscribed circle diameter greater than 12 mm and a circumscribed circle diameter less than 20 mm at the first stem end, and,
   wherein, the center portion of the sintered, machinable preform is shapable into a final dental restoration by a grinding process.

17. The method of claim 16, wherein the body of the intermediate shaped form comprises a cylindrical body shape having a circular cross-sectional geometry parallel with the top and bottom ends.

18. The method of claim 16, wherein the center portion comprises a length between 10 mm and 15 mm after sintering.

19. A method of making a sintered zirconia ceramic machinable preform for use in shaping a dental restoration comprises the steps of:
   a) obtaining a porous yttria-stabilized zirconia ceramic block material that is stabilized with 2 mol % to 7 mol % yttria;
   b) shaping the porous zirconia ceramic block material to form an intermediate shaped form that comprises
      (i) a porous zirconia ceramic material preform body comprising a center portion between a top end and a bottom end, wherein the center portion comprises a cylindrical shape comprising a curved outer surface and a circular cross-sectional geometry parallel to the top and bottom ends; and
      (ii) a stem projecting from the curved outer surface of the center portion between the top and bottom ends from a first stem end; and
      (iii) an attaching member attached and extending generally orthogonally to a second stem end; and
   c) sintering the intermediate shaped form to a density of 98% to 100% of the theoretical maximum density of the zirconia ceramic block material to form a sintered yttria-stabilized zirconia ceramic machinable preform, the sintered machinable preform having a Vickers hardness value in the range of 10HV GPa-15HV GPa, the sintered machinable preform comprising:
      (i) a cylindrically shaped preform body comprising a circular cross-section and sintered yttria-stabilized zirconia ceramic that is machinable into a dental restoration by a grinding process throughout the circular cross-section, and
      (ii) a sintered stem that projects from a curved outer surface of the cylindrically shaped preform body adjacent the circular cross-section,
   wherein, the circular cross-sectional geometry has an outer diameter of less than 20 mm at the location of the stem.

20. The method of making a sintered zirconia ceramic machinable preform of claim 19, further comprising forming at least one cavity from the outer surface of the preform body that extends from a top end surface, a bottom end surface, or both the top end surface and the bottom end surface, towards the center portion.

* * * * *